United States Patent

Prochnow

[11] 4,240,121
[45] Dec. 16, 1980

[54] BROADBAND MAGNETIC TAPE TRANSDUCER HEAD

[75] Inventor: Rudolf Prochnow, Darmstadt-Eberstadt, Fed. Rep. of Germany

[73] Assignee: Robert Bosch GmbH, Stuttgart, Fed. Rep. of Germany

[21] Appl. No.: 4,382

[22] Filed: Jan. 18, 1979

[30] Foreign Application Priority Data

Feb. 2, 1978 [DE] Fed. Rep. of Germany ....... 2804380

[51] Int. Cl.³ ........................... G11B 5/22; G11B 5/20
[52] U.S. Cl. ................................ 360/122; 360/123; 360/125
[58] Field of Search ........ 360/122, 125, 123, 126–127, 360/110, 66, 55

[56] References Cited

U.S. PATENT DOCUMENTS

| | | | |
|---|---|---|---|
| 3,244,818 | 4/1966 | Bick et al. | 360/125 |
| 3,303,292 | 2/1967 | Bedell, Jr. et al. | 360/125 |
| 3,535,466 | 10/1970 | Foster | 360/125 |
| 3,582,572 | 6/1971 | Camras | 360/125 |
| 3,651,278 | 3/1972 | Chupity et al. | 360/125 |
| 3,987,487 | 10/1976 | Berger | 360/123 |

*Primary Examiner*—Alfred H. Eddleman
*Attorney, Agent, or Firm*—Frishauf, Holtz, Goodman & Woodward

[57] ABSTRACT

To reduce the inductance of a ferrite transducer head, the head is formed of ferrite-type pole pieces laterally extended by non-magnetic material of high wear resistance characteristic to decrease the per-unit application pressure of the tape against the overall head, the pole pieces being connected by a yoke of cross section which is small with respect to that of the pole pieces, the signal transducing coil being wound on the yoke. To provide space for winding of the coil, the pole pieces are formed with recess openings, and the extending non-magnetic support elements are likewise formed with an opening to provide space for the coil. The entire head can be mounted on a support, for example by an adhesive, made of non-magnetic material.

4 Claims, 3 Drawing Figures

BROADBAND MAGNETIC TAPE TRANSDUCER HEAD

The present invention relates to broadband magnetic tape transducer heads, and more particularly to tape transducer heads for use in video tape recording (VTR), for recording of video signals preferably on an inclined track on a magnetic tape which is passed in a spiral path over a cylindrical surface within which two or more transducer heads rotate to form a scanner assembly.

BACKGROUND AND PRIOR ART

Video tape transducer heads to transduce video signals on magnetic recording tape have previously been proposed; they have to meet the requirements that the head surface itself is resistant against abrasion and wear due to contact of the head surface with the tape in high-speed relative movement. To provide for suitable transducing of signals, transducer heads have been proposed in which, in the direction of relative rotation between tape and transducer head, the head surface is at least three times the wave length of the lowest frequency of the signal to be recorded or reproduced. To decrease the engagement pressure, per unit area, on the transducer head itself, the transducer head surface is extended laterally—in the direction of relative movement between tape and transducer head—by additional support elements made of wear-resistant, non-magnetic material. Transducer heads of this type have been described in the literature, see, for example, German Patent Publication DE-AS 15 24 841. This type of transducer head has two windings which are wound over the pole pieces of the magnetic portion of the transducer head. These pole pieces have a comparatively large extension in the scanning direction. The large extension of the pole pieces, then, will result in dimensions for the windings which are comparatively large and thus will have comparatively high induction and inherent capacity. The capacity and induction effects of the windings themselves result in a resonance or tank-circuit effect which are undesirable, and the inherent frequency of which result in distortion of signals to be transduced.

THE PRESENT INVENTION

It is an object to provide a tape transducer head for transducing signals between a magnetic tape and the head, particularly for use in VTR, and which, preferably, can be incorporated in scanner assemblies for VTR, which has low induction, is of small size, and can be readily manufactured.

Briefly, the pole pieces of the magnetic head are joined by a yoke portion which has a cross section substantially less than the cross section of the pole pieces, the winding for the head being placed around the yoke. The pole pieces themselves, preferably, are formed with a recess to permit the winding to be placed thereover; the extension support elements to extend the surface of engagement of the tape are likewise formed with a recess to accomodate the winding. Only a single winding is used, which substantially decreases the self-induction of the combination of winding-core formed of the yoke and pole pieces of the transducer.

The reduced dimensions of the winding reduce the inherent induction thereof; this substantially increases the transducing efficiency of the head, particularly at higher frequencies. The range of utilization of the head thus can be extended towards higher frequencies than heretofore possible without substantial drop-off of transducing efficiency.

DRAWINGS, illustrating a preferred example:

The invention will be described in connection with a VTR transducer head, used for recording or reproduction of video signals by means of several magnetic heads, located on the circumference of a rotating scanner wheel. The magnetic tape itself is passed over the circumference of a cylinder in a spiral path, the signals being recorded on the tape on inclined parallel tracks as the various heads of the scanner assembly rotate within the cylinder. Such systems of VTR are well known, and heads of the present invention can be used with any such well known systems.

Figures 1, 2:
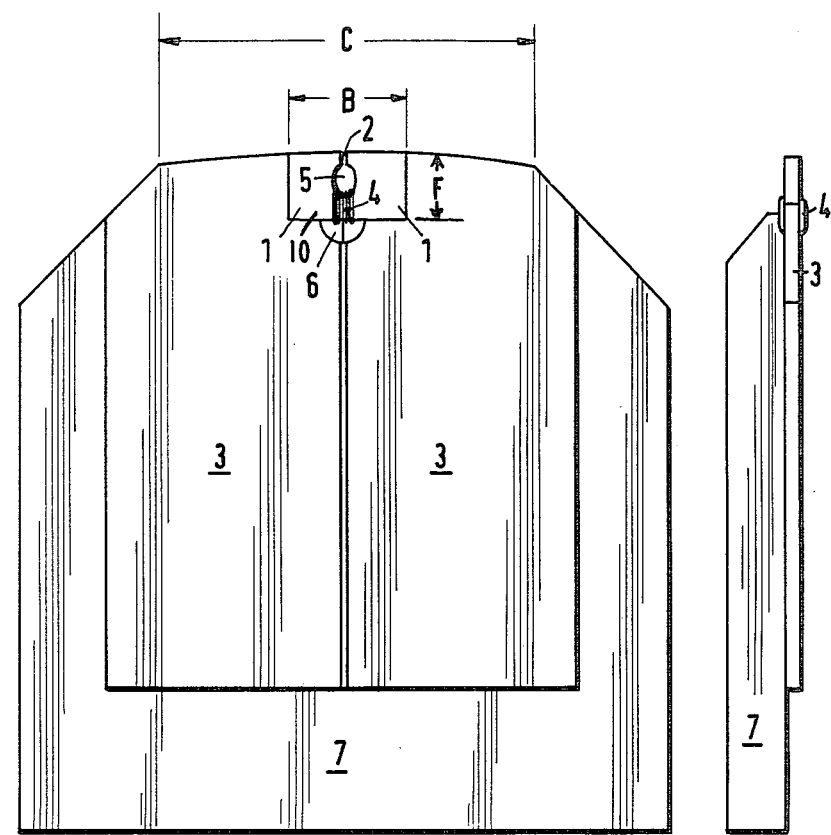
FIG. 1 is a front view of the transducing arrangement in accordance with the present invention.
FIG. 2 is a side view thereof.

The core of the transducing head has two mirror image or mirror symmetrical pole pieces 1, made of wear-resistant, ferromagnetic material, for example of an alloy of iron aluminum and silicon. Such alloys are commercially available and can be obtained in ordinary channels of trade. Other materials which can be used are pressed or sintered ferrites. Materials which have high resistance against wear have a disadvantage, however, in that their eddy current losses are substantial above all at high frequencies. In order to reduce the eddy current losses and the inductance of the winding, the two halves of the core 1 are reduced in size both at the side facing the tape as well as at the side remote from the air gap 2. The reduction in size is to a dimension indicated at B in FIG. 1. The size of the core is reduced to the extent possible while still maintaining sufficient mechanical strength.

The core halves 1 are extended in the direction of relative movement between the transducer head and the tape by support elements 3 made of material which is non-magnetic and which is highly resistant to wear, for example of a copper-beryllium alloy or non-magnetic ferrite. The copper-beryllium alloy or non-magnetic ferrite pieces 3 extend the head region of engagement of the tape with the head to the dimension C (FIG. 1) which is sufficient to reduce the specific loading of the tape between magnetic head and tape to such an extent that wear on the polished head surface is reduced to tolerable limits and such that the video head can have an operating time of many hundred hours.

In accordance with the present invention, the induction of the video head is reduced by reducing the length of the flux lines within the magnetically effective pole areas of the video heads by locating the winding 4 as close to the polished engagement surface of the magnetically active portion of the transducer head, as possible. A yoke 10 connects the pole pieces 1, the yoke being of cross section which is substantially less than the cross section of the pole pieces 1. The winding 4 is placed closely around the yoke 10 (see FIG. 1) and received within the pole pieces 1 by a recess or opening or window 5 formed therein. Likewise, the support elements 3 are formed with an opening 6 to permit placement of winding 4 therein. The window 5 formed in the pole pieces 1 is so dimensioned that it is just large enough to permit placement of the winding 4 over the yoke 10.

The video magnetic head is manufactured as follows:

First, the pole pieces 1 are made separately; the support pieces 3 are made e.g. from non-magnetic ferrite formed with suitable openings to receive the pole pieces 1. The yoke 10 may be integral with the respective pole piece 1 made from suitable magnetic ferrite, forming an extension directed towards the other pole piece. The pole pieces 1, with the yoke extension 10, are then secured in the support elements 3 by a high melting glass solder. The pole pieces 1 and the support elements 3 are then polished at the gap surface 2. Thereafter, the two halves of the core are secured together by a second solder step forming the gap 2 by using a low melting glass. Finally the head is ground and polished at the surface engaged by the tape. Rather than glass soldering, brazing with brazing materials of different melting temperatures can be used so that the pole pieces 1, with the yoke 10 set into the support elements 3, do not change position upon joining together of the pole pieces 1 and yoke 10 and support elements 3. Brazing is suitable if the pole pieces are made of metallic material. The winding 4 is then wound in the opening formed by the window 5 between the pole pieces and the opening or window 6 of the support elements 3. The video transducer head, now finished, is then secured on a carrier or support plate 7, for example by clamping, a screw connection, adhesion, or any other well known suitable connection. The carrier 7, together with the video head formed by the pole pieces 1, yoke 10, winding 4 and the extension support pieces 3, is then secured to a head scanner wheel.

Figure 3:
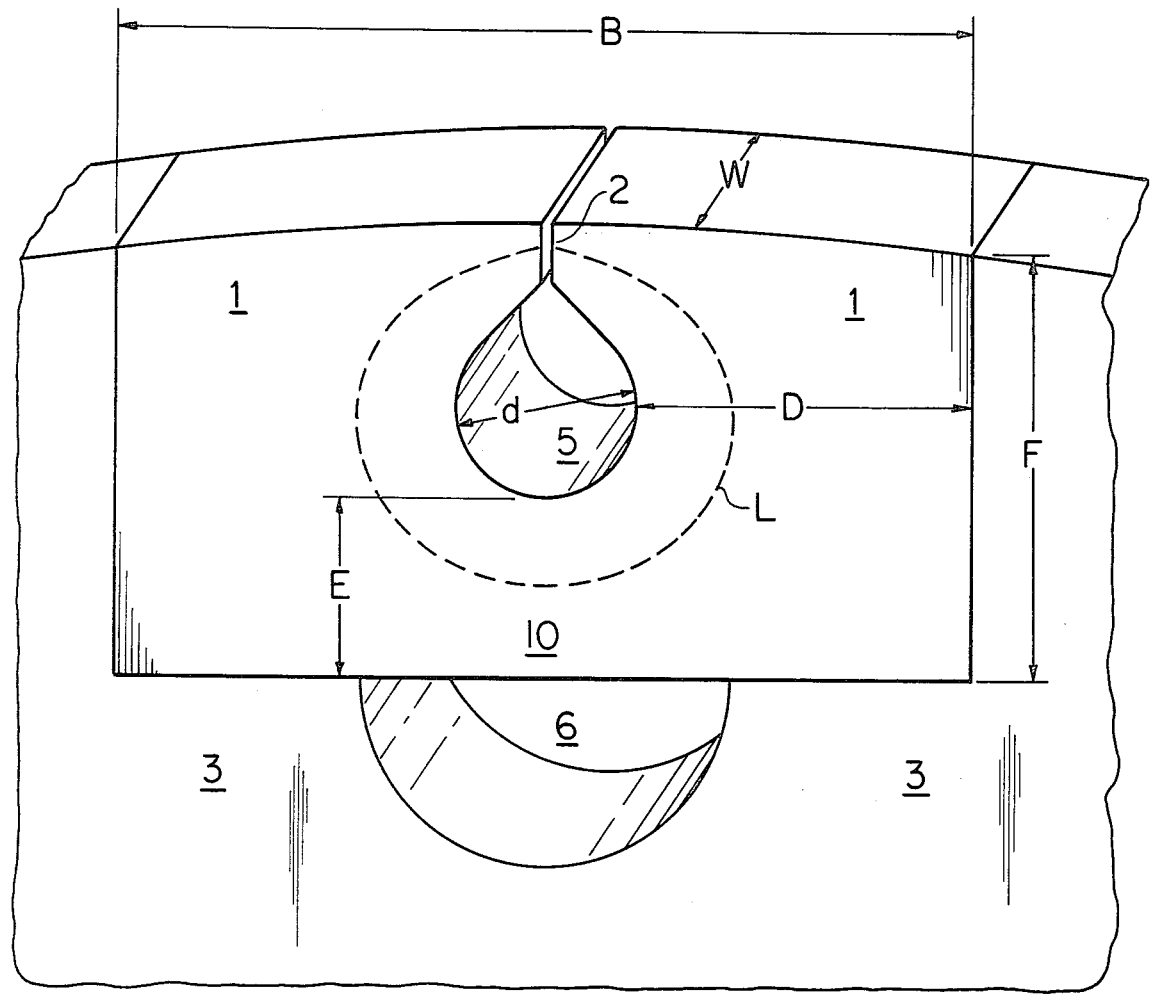
FIG. 3 is a greatly enlarged fragmentary front perspective view of the head structure with the winding omitted.

For a typical VTR scanner, the following head configuration and dimensions are suitable (with reference to FIGS. 1 and 3):

Length of head face, B: 1.4 mm
track width, W: 0.15 mm
diameter d of hole 5 for windings: 0.3 mm
height F of the pole pieces 1: 0.7 mm
cross section of pole piece 1 at narrowest point, that is at D: 0.083 mm$^2$
cross section of yoke 10 at narrowest point E: 0.04 mm$^2$
cross section of gap 2: 0.012 mm$^2$
calculated length L of the magnetic path: about 1.8 mm
winding: 15 turns of enamelled copper wire of 0.06 mm diameter.

Both the pole pieces 1 and the yoke 10 preferably are of highly permeable ferrite material.

I claim:

1. Broadband magnetic tape transducer head adapted to have a magnetic tape pass over a head surface thereof to transduce signals of various frequencies comprising
   a pair of pole pieces (1, 1) of magnetically active homogenious material to conduct magnetic flux therein, separated by a gap (2), the extend (B) of the pole pieces, in the direction of relative movement between the head and the tape being at least three times as long as the wave length of the lowest frequency signal to be transduced,
   tape support elements (3) of wear-resistant, non-magnetic material located adjacent the pole pieces (1) to form an extended support surface with the pole pieces for tape engaging said head,
   a yoke (10) connecting said pole pieces, said yoke having a minimum cross section (E) which is small with respect to the minimum cross section (D) of the pole pieces;
   and a single winding (4) closely wound about said yoke (10).

2. Transducer head according to claim 1, wherein both the pole pieces (1) and the yoke (10) comprise highly permeable ferrite material.

3. Transducer head according to claim 1 or 2, wherein the pole pieces (1, 1) and the yoke (10) are inserted in openings formed in said tape support elements (3), said tape support elements being formed of non-magnetic material.

4. Transducer head according to claim 3, further including a support plate (7) secured to said tape support element (3) and supporting both said tape support elements and said pole pieces (1, 1) and yoke.

* * * * *